United States Patent [19]

Felice et al.

[11] Patent Number: 4,510,253

[45] Date of Patent: Apr. 9, 1985

[54] ALUMINUM RESISTANT CERAMIC FIBER COMPOSITION

[75] Inventors: Frank T. Felice, Norristown; Celeste B. Yonushonis, Paoli, both of Pa.

[73] Assignee: Combustion Engineering, Inc., Windsor, Conn.

[21] Appl. No.: 498,379

[22] Filed: May 26, 1983

[51] Int. Cl.$^3$ ............................................. C04B 35/80
[52] U.S. Cl. ...................................... 501/95; 106/84; 106/85; 210/510.1; 501/124; 501/127; 501/128; 501/133; 501/155
[58] Field of Search ................. 501/95, 124, 133, 128, 501/127, 155; 210/510.1; 106/84, 85

[56] References Cited

U.S. PATENT DOCUMENTS

| | | | |
|---|---|---|---|
| 2,997,402 | 8/1961 | McDonald et al. | 501/127 |
| 3,231,401 | 1/1966 | Price et al. | 501/128 |
| 3,524,548 | 8/1970 | McDonald et al. | 210/510.1 |
| 3,629,116 | 12/1971 | Gartner et al. | 501/133 |
| 3,920,578 | 11/1975 | Yates | 501/133 |
| 4,041,199 | 8/1977 | Cartwright | 501/133 |
| 4,069,057 | 1/1978 | Kamei et al. | 501/133 |
| 4,150,189 | 4/1979 | Pusch | 501/124 |
| 4,248,572 | 2/1981 | Myles | 501/133 |
| 4,328,033 | 5/1982 | Boberski et al. | 106/84 |

*Primary Examiner*—Helen M. McCarthy
*Attorney, Agent, or Firm*—Richard H. Berneike

[57] ABSTRACT

A ceramic fiber composition for use in contact with molten aluminum alloys is disclosed which is lightweight and porous. The composition contains ceramic fibers, binders and an additive containing $9Al_2O_3 \cdot 2B_2O_3$. The additive is preferably aluminum boron slag which is a by-product of the production of ferro-boron.

10 Claims, No Drawings

ALUMINUM RESISTANT CERAMIC FIBER COMPOSITION

BACKGROUND OF THE INVENTION

This invention relates to ceramic fiber compositions for use in contact with molten aluminum alloys.

Ceramic fiber refractory materials such as fiber moldable compositions and trowellable formulations of fibers and binders have many refractory applications. Lightweight and highly insulating, they find use in transfer ladle covers, patching medium for refractory superstructures, and in many aluminum metal contact applications such as liners for ladles, troughs, spouts, distribution pans, launderers and filter boxes.

Ceramic fibers are alumina-silica fibers which are either spun or blown from a melt. Although the fiber composition commonly used is about 50% $Al_2O_3$ and 50% $SiO_2$, fibers of higher or lower $Al_2O_3$ levels are suitable depending upon the refractoriness required for the intended application.

Conventional fiber moldables are lightweight, highly porous materials which are not resistant to penetration and wetting by molten aluminum. In molten aluminum contact applications, a red clay parting agent is spread over the trowelled moldable to seal the surface and to retard metal penetration. However, the parting agent is also not intrinsically resistant to attack by the molten aluminum and rapid penetration of the metal into the ceramic fiber material results in a short service life.

SUMMARY OF THE INVENTION

An object of the present invention is to provide a ceramic fiber material which will not be wetted and attacked by molten aluminum alloys. The invention is a lightweight, porous refractory composition which contains ceramic fibers, binders and an additive material containing primarily corundum and aluminum borate. The additive is preferably aluminum boron slag, and it forms a product which is highly resistant to penetration and wetting by molten aluminum metal.

DESCRIPTION OF THE PREFERRED EMBODIMENTS

In a search for refractory materials compatible with aluminum alloys and operating conditions, an essentially nonreactive material was found. This material, referred to herein as "aluminum boron slag" is a by-product of the production of ferro-boron.

Ferro-boron is an alloy of boron and iron that is used as an additive to some steels to increase their boron level, and thereby their capacity for being thermally hardened. Ferro-boron is produced by the aluminothermic reduction of iron oxide and boron oxide by aluminum metal at elevated temperatures. As the reduction proceeds, the molten iron and boron combine and fall to the bottom of the reaction vessel. After cooling, the solidified mass contains a lower portion composed of ferro-boron which is crushed and sold. The upper portion of the mass is composed of essentially aluminum oxide, boron that has reacted with it, and some residual slag modifiers depending on the exact process used. The upper portion of the mass, aluminum boron slag, is a waste material and is generally discarded.

An object of this invention is to take advantage of the unexpected non-wetting properties of this waste material by aluminum alloys when it is used as a refractory additive. In the absence of a ready source, it is possible to synthetically produce this slag material. A synthetic aluminum-boron slag is claimed to fall within the bounds of this invention. A requirement of such synthetic slag would be that substantial amounts of aluminum borate ($9Al_2O_3.2B_2O_3$) be present as the active ingredient.

The minerology of a typical aluminum boron slag as used in this invention was shown by X-ray diffraction determination to be predominantly aluminum borate ($9Al_2O_3.2B_2O_3$) and corundum ($Al_2O_3$), with minor amounts of accessory materials such as calcium fluoride ($CaF_2$), calcium aluminum borate ($CaAl_2B_2O_3$), and traces of some calcium aluminate phases. It is understood that the active phase is the aluminum borate, and the other phase may vary in concentration or be eliminated entirely without effecting the ability of the slag to protect refractory materials from attack by molten aluminum alloys. It is desirable that the aluminum borate be in the crystalline form $9Al_2O_3.2B_2O_3$.

A typical chemistry of the slag in weight percent is as follows:

$Al_2O_3$: 85.5
$B_2O_3$: 6.0
$SiO_2$: 0.9
$CaO$: 3.1
$MgO$: 0.6
$K_2O$: 0.4
$Na_2O$: 1.1
$Fe_2O_3$: 0.9
$CaF_2$: 1.5

The composition range for the slag may vary. The boron level (expressed as $B_2O_3$) should be kept above about 4 percent. The iron (expressed as $Fe_2O_3$) is present as an impurity but can vary up to about 4 percent with little problem while the fluoride, also an impurity (expressed as $CaF$) should be kept as low as possible and not over 2 percent because of possible adverse effects on some bond phases during curing. Alkali and alkali earths ($Ca^{++}$, $Mg^{++}$, $Na^+$, and $K^+$) being unnecessary and undesirable constituents, should be kept as low as possible because of the negative effect on the refractoriness of the additive. It is understood that a synthesized boron slag is possible, and that such synthesized slag can contain up to 100 percent aluminum borate. The sizing of the slag can vary between wide limits and still be effective, such as from about 50 mesh to about 320 mesh. All references herein are to Tyler screen size. A more satisfactory range is between 70 and 200 mesh with the preferred sizing being minus 100 mesh. As used herein, the term "aluminum boron slag" is meant to include this synthetic version.

Several refractory fiber mixtures can be rendered resistant to molten aluminum alloys by the addition of a quantity of aluminum boron slag into their formulation. For example, fiber moldables and vacuum formed fiber shapes are candidates for additions of aluminum boron slag. The ceramic fibers are alumina-silica fibers, either spun or blown from a melt. Fiber length can vary between ¼" to 1½" long, with the preferred length being ¾". Although the fiber composition commonly used is $50Al_2O_3.50SiO_2$, fibers of higher or lower $Al_2O_3$ level are suitable, e.g. $57Al_2O_3.43SiO_2$, depending upon the refractoriness required by the intended application. Fiber moldable formulations can be sold either as a wet mix or a two-component mix in which the liquids are added at the job site to a packaged blend of dry ingredients. The composition of the fiber moldable composition expressed in weight percent is as follows:

|  | Range | Preferred |
| --- | --- | --- |
| Ceramic Fiber | 20–65 | 18–35 |
| Polyethylene Oxide | 0.4–5 | 0.5–2 |
| 40% Colloidal Silica Binder | 15–50 | 20–35 |
| Aluminum Boron Slag, or | 2–20 | 8–15 |
| Aluminum Borate | 1–12 | 4–8 |
| Water | 15–50 | 20–35 |

Polyethylene oxide, a high molecular weight polymer, is added as a thickener to enhance the trowellability of the mix. It also imparts green strength to the moldable. After drying, the moldable body is rigid and tightly bonded throughout.

The alkali stabilized dispersion of colloidal silica in water is the preferred binder, and is reponsible for the high temperature bond, although other binders, such as aluminum phosphate, alkali metal phosphates, sodium silicates and calcium aluminates, are acceptable alternatives. These alternate binders make possible the production of a dry fiber moldable mix to which water can be added at the job site.

The aluminum boron slag may be added in several grain sizings, from 50 mesh to minus 100 mesh by down, the latter being the preferred sizing in the composition described above.

Refractory shapes cast from the described formulation exhibit a bulk density of 30 lbs/ft$^3$, and a linear change of 2.0% after firing at 1700 F. for 5 hours. In addition, the wet formulation exhibits a shelf life of 6 months without excessive loss of water and trowellability, if stored in an airtight plastic canister at room temperature.

EXAMPLE 33 parts by wt. of a solution containing 40% colloidal silica dispersion and 26 parts by wt. water were blended at medium speed in a Hobart mixer. Polyethylene oxide, 0.6 parts by wt. was slowly added while mixing, and fully dispersed. 10 parts by wt. aluminum-boron slag, minus 100 mesh by down, was added while blending at the lowest mixer speed. 33 parts by wt. of 2400 F. fibers, chopped to 1", were added, and mixing continued until all ingredients were uniformly blended. Trowellability was tested, and additional water was added as necessary. An identical mix, without the addition of slag, was also fabricated. Test cups of both mixes were cast, dried 24 hours at 230 F., and fired 8 hours at 1000 F. Measured quantities of aluminum alloy #7075 were added to each cup, the furnace temperature was raised to 1500 F. and the cups were isothermally heat-treated for 72 hours. At the end of this test period, the molten aluminum was drained from the test cups, and the cups were cooled and sectioned. Examination showed that the cup containing aluminum-boron slag was completely free of any metal penetration or reaction. The thin residual metal shell left after draining was easily peeled from the cup surface without pulling out pieces of refractory. The standard cup without the addition of slag exhibited severe bottom and sidewall penetration. Only a thin dross crust remained at the cup surface, which could not be removed without further damage to the sample.

The following table, which lists moldable formulations in %, shows the effect of increasing levels of aluminum boron slag on resistance to penetration and corrosion by molten aluminum alloy #7075.

|  | I | II | III | IV | V | VI |
| --- | --- | --- | --- | --- | --- | --- |
| Ceramic Fibers | 33.6% | 31.0 | 30.6 | 30.4 | 29.1 | 28.0 |
| Aluminum Boron Slag | — | 4.9 | 9.1 | 10.6 | 13.1 | 16.7 |
| 40% Colloidal Silica Dispersion | 36.2 | 35.0 | 32.9 | 32.2 | 31.5 | 30.2 |
| Polyethylene Oxide | 0.7 | 0.6 | 0.6 | 0.6 | 0.6 | 0.5 |
| Water | 29.5 | 28.5 | 26.8 | 26.2 | 25.1 | 24.6 |
| Cup Penetration After 72 Hours at 1500 F | 100% (Severe Reaction) | 50% (Heavy Reaction) | None (No Reaction) | None (No Reaction) | None (No Reaction) | None (No Reaction) |

Vacuum formed fiber refractories are also candidates for the addition of aluminum boron slag. In this process a flocculated slurry of fibers, water, binders and slag are drawn into a mold attached to a vacuum, which removes the excess water. The wet shape is released from the mold by reverse airflow, and dried.

The composition for the vacuum formed fiber composition in weight percent is as follows:

|  | Range | Preferred |
| --- | --- | --- |
| Ceramic Fiber, chopped | 40–60% | 40% |
| Fused Silica Aggregate | 10–40 | 30 |
| 40% Colloidal Silica Dispersion | 2–20 | 15 |
| Starch Solution | 0.4–4 | 2.0 |
| Aluminum Boron Slag, or | 8–20 | 12 |
| Aluminum Borate | 4–12 | 6 |

Once again the ceramic fiber length and composition can vary as required for the intended application.

Fused silica aggregate is added to impart hardness and density to the board. Other aggregates are also suitable, for example, alumina-silicate aggregate, or even ball-milled glass spheres from the fiber spinning process.

The colloidal silica dispersion and the starch form the 2-component binder system. The starch is added to impart green strength. The cationic colloidal silica dispersion provides the high temperature bond. The silica dispersion also flocculates the dispersion by forming the link between the fibers and the starch, both anionic in nature.

The aluminum boron slag must be added in a fine grain sizing in order to remain in suspension with the other slurry components without settling out. The fine sizing also allows maximum surface area, which is most effective in resistance to attack by molten aluminum.

It can be seen that the moldable and the vacuum formed shapes have significantly different formulations. The moldable formulation contains sufficient water to form it into a wet fibrous product with a trowelling consistency. The vacuum formed shape formulation, on the other hand, does not contain any water as a separate ingredient. The listed composition is dispersed in water as a solid slurry of approximately 3% solids from which the shapes are vacuum formed. The formulation also normally contains less binder than the molecule. However, the amount of aluminum boron slag or aluminum borate, which is the active ingredient of the present invention, is present in the vacuum formed shape composition at approximately the same level as in the moldable.

We claim:

1. A lightweight, porous ceramic fiber composition resistant to wetting and attack by molten aluminum alloys comprising:
   (a) from 20 to 65 weight % alumina silica ceramic fiber;
   (b) an additive containing essentially crystalline $9Al_2O_3.2B_2O_3$ such that the ceramic fiber composition contains from 1 to 12 weight % $9Al_2O_3.2B_2O_3$; and
   (c) the remainder comprising a refractory binder in a quantity at least sufficient to bind said ceramic fiber composition together.

2. A ceramic fiber composition as recited in claim 1 wherein said composition is a moldable composition and said binder comprises from 15 to 50 weight % of a colloidal silica dispersion based on the total weight of the composition.

3. A ceramic fiber composition as recited in claim 2 and further including from 0.4 to 5 weight % polyethylene oxide.

4. A ceramic fiber composition as recited in claim 2 wherein said colloidal silica dispersion comprises a dispersion containing about 40% colloidal silica.

5. A ceramic fiber composition as recited in claim 2 and further including a quantity of water to produce the desired consistency.

6. A ceramic fiber composition as recited in claim 1 wherein said binder is selected from the group consisting of colloidal silica dispersion, aluminum phosphate, alkali metal phosphates, sodium silicate, calcium aluminate and starch.

7. A ceramic fiber composition as recited in claim 1 for use in the vacuum forming of shapes comprising:
   (a) from 40 to 60 weight % ceramic fiber; and
   (b) from 4 to 12 weight % $9Al_2O_3.2B_2O_3$.

8. A ceramic fiber composition as recited in claim 7 wherein said binder comprises a mixture of a colloidal silica dispersion and a starch solution.

9. A ceramic fiber composition as recited in claim 1 wherein said additive comprises aluminum boron slag.

10. A ceramic fiber composition as recited in claim 9 wherein said aluminum boron slag is minus 100 mesh.

* * * * *